(12) United States Patent
Rupieper et al.

(10) Patent No.: US 6,731,277 B2
(45) Date of Patent: May 4, 2004

(54) PROCESS FOR GENERATING A COMPUTER IMAGE OF A COATED THREE-DIMENSIONAL OBJECT

(75) Inventors: Paul Rupieper, Wuppertal (DE); Christian Voyé, Gevelsberg (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 344 days.

(21) Appl. No.: 09/796,786

(22) Filed: Mar. 1, 2001

(65) Prior Publication Data

US 2002/0122033 A1 Sep. 5, 2002

(51) Int. Cl.$^7$ ............................................. G06T 15/00
(52) U.S. Cl. ..................................................... 345/419
(58) Field of Search .............................. 345/419, 619; 356/381, 372, 371, 446

(56) References Cited

U.S. PATENT DOCUMENTS

| | | | |
|---|---|---|---|
| 5,550,632 A | * 8/1996 | Harata | 356/446 |
| 5,991,042 A | 11/1999 | Rupieper et al. | 356/381 |
| 6,144,454 A | * 11/2000 | Rupieper et al. | 356/630 |

OTHER PUBLICATIONS

Optimore Opus Studio Pamphlet, Opticore, 4 pages, 2001.
Opticore Opus Realizer Pamphlet, Opticore, 2 pages, 2001.

* cited by examiner

Primary Examiner—Phu K. Nguyen
(74) Attorney, Agent, or Firm—Sudhir C. Deshmukh (57) ABSTRACT

A process for the generation of a computer image of a coated, three-dimensional object involves preparing a coating comprising a relevant coating layer with variable layer thickness on one or more test panels; taking a plurality of measurements of one or more optical surface properties as a function of the layer thickness of the relevant coating layer; storing the optical data in a datafile with assignment of the layer thickness of the relevant coating layer; facetting the visible surface(s) of a three-dimensional object by computer into a sufficient number of flat polygonal areas each being sufficiently small for the sufficiently accurate description of the surface topography; assigning layer thickness of the relevant coating layer and associated optical data in each case to each individual polygonal area by computer; and assembling the polygonal areas into a computer image of the three-dimensional object.

17 Claims, 2 Drawing Sheets

PROCESS FOR GENERATING A COMPUTER IMAGE OF A COATED THREE-DIMENSIONAL OBJECT

FIELD OF THE INVENTION

The present invention relates to a process for the generation of a computer image of a coated, three-dimensional object.

BACKGROUND OF THE INVENTION

The computer-aided, three-dimensional image of an actually existing or virtual three-dimensional object belongs to the prior art. The observer may be given an impression of the optical effect of a single-color coated three-dimensional object (cf. brochure on OPUS software version 3.2 from Opticore). Deviations within optical surface properties prevailing on the surface of the object and which are the result of a non-homogeneous layer thickness distribution of a coating layer on the three-dimensional object cannot be represented.

It is desirable to develop a process which is suitable for allowing the representation of such deviations.

SUMMARY OF THE INVENTION

The invention comprises a process for the generation of a computer image of a coated, three-dimensional object comprising the steps of, in appropriate order:
a) preparing a coating comprising a relevant coating layer with variable layer thickness on one or more test panels,
b) taking a plurality of measurements of one or more optical surface properties as a function of the layer thickness of the relevant coating layer,
c) storing the optical data in a datafile with assignment of the layer thickness of the relevant coating layer,
d) facetting the visible surface(s) of a three-dimensional object by computer into a sufficient number of flat polygonal areas each being sufficiently small for the sufficiently accurate description of the surface topography,
e) assigning layer thickness of the relevant coating layer and associated optical data in each case to each individual polygonal area by computer, and
f) assembling the polygonal areas into a computer image of the three-dimensional object.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE EMBODIMENTS

The term "relevant coating layer" used in the description and in the claims means the coating layer the layer thickness of which has an influence or the major influence on optical surface properties of the coating or in the influence of which one is interested. The term "layer thickness" means dry layer thickness in each case.

A coated, three-dimensional object may be represented in a "virtual" manner with the process according to the invention. The term "virtual" means that the image or the representation of the object exists in digital or electronic format in a computer. The object itself may exist only in the computer in digital/electronic form, or the object may be an actually existing object.

Figure 1:
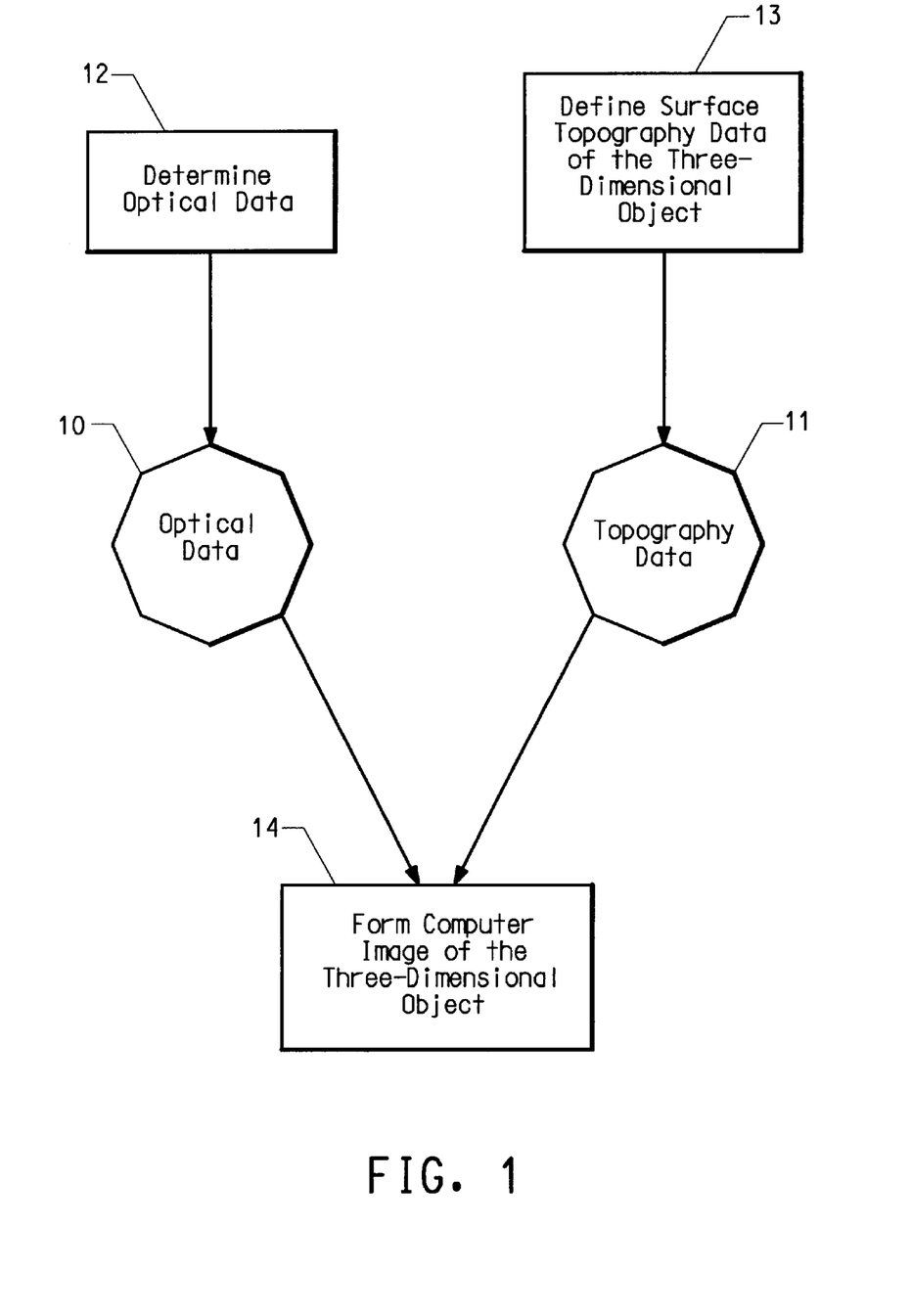
FIG. 1 shows a flowchart of the three major groupings of steps needed to produce a computer image of a three-dimensional object.

Referring to FIG. 1, the process comprises substantially a series of steps in three major groupings: (1) determining the optical data (10) (as a function of the layer thickness of the relevant coating layer and optionally, in addition, other relevant criteria) (12); (2) defining the surface topography data (11) of the three-dimensional object (13); and (3) merging the two datasets to form a computer image of the three-dimensional object (14). It is irrelevant whether the optical data are determined first or the surface topography. Of course, both must have been carried out before the relevant datasets can be merged. Thus, there is flexibility in the order of performing the steps in the process.

Figure 2:
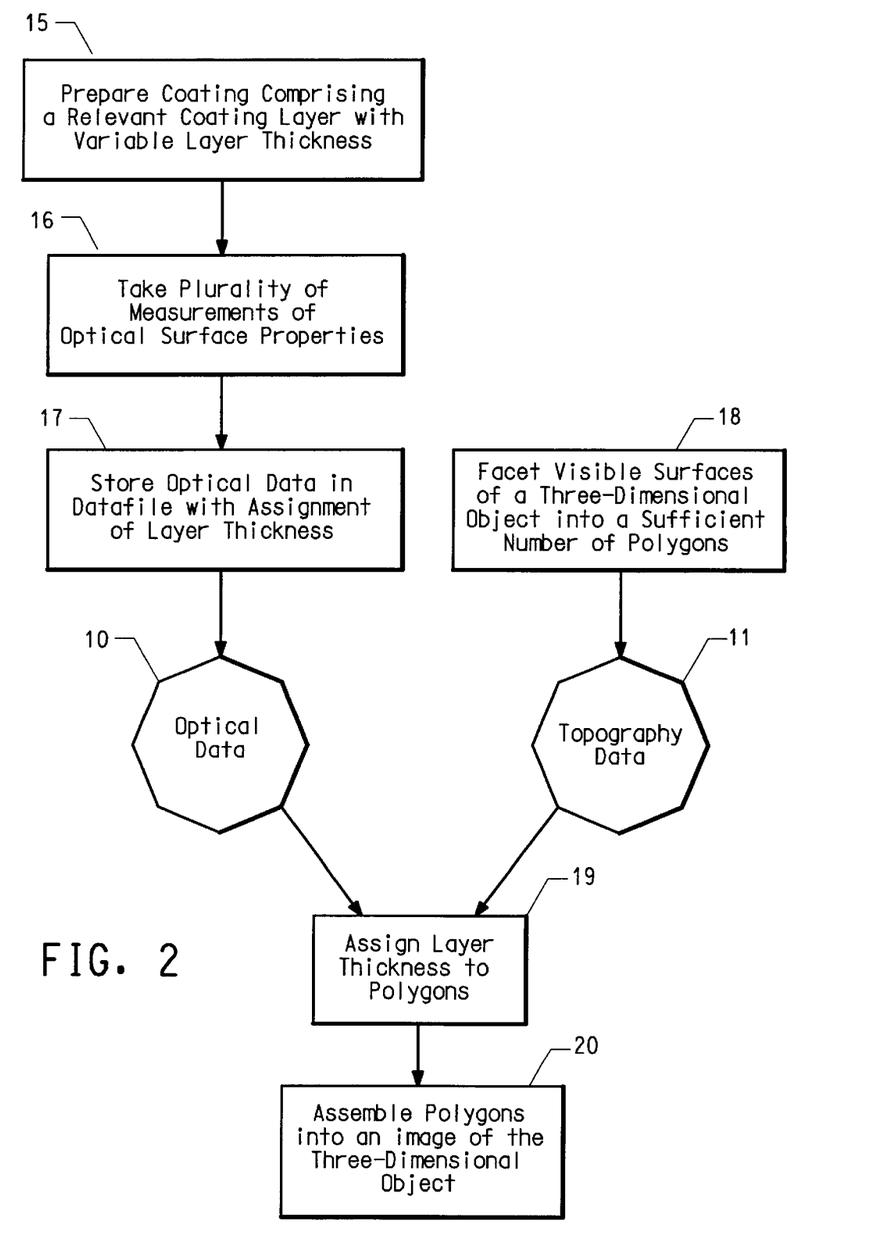
FIG. 2 shows a detailed flowchart of the process of the invention.

Referring to FIG. 2, in order to determine the layer thickness-dependent optical data, a coating with variable layer thickness of the relevant coating layer is prepared on one or more test panels, and one or more optical surface properties of interest are measured. The optical data are stored in a datafile (10) with assignment of the associated layer thickness of the relevant coating layer.

Several test panels may each be provided with an inherently identical coating, the relevant coating layer being applied in a different layer thickness in each case FIG. 2 (15). In preference, only one test panel is coated, the relevant coating layer being applied with a wedge-shaped layer thickness gradient. The relevant coating layer may be, for example, a primer, a primer surfacer, a base coat, a clear coat or top coat layer. The layer thickness region within which the layer thickness is varied is generally in the range from 1 $\mu$m to 100 $\mu$m and depends on each individual case. For example, the layer thickness of the relevant coating layer may be varied within a region below and/or in and/or above the hiding power of the coating used to prepare the relevant coating layer.

The test panels are, in particular, flat metal test panels, for example, body steel or aluminium, or of plastic, for example, 10 cm times 15 cm to 30 cm times 60 cm in size conventionally used for test coatings. The test panels may be uncoated or provided with a single-layer or multi-layer precoating. Metal test sheets may be provided with, for example, an electrodip-coating layer conventionally used in motor vehicle coating, or with an electrodip-coating layer and a primer surfacer layer. Plastic panels may be provided with a plastics primer. The coating structure on the test panels may correspond to the coating structure to be applied to the three-dimensional object. It may be a single-layer top coating consisting of the relevant coating layer, or it may be a multi-layer coating wherein one of the coating layers that make up the multi-layer coating is the relevant coating layer. For example, the base coat layer or clear coat layer of a color-and/or special effect-imparting base coat/clear coat two-layer coating may be the relevant coating layer.

The test panels may assume a horizontal or vertical position during the preparation of the coating, for example, during application and drying or curing of the coatings. It is particularly preferred to provide one test panel in a horizontal position and a further test panel in a vertical position and optionally at least one further test panel in (various) positions arranged between the horizontal and the vertical position with the coating.

The test panels are coated preferably by spraying, preferably by means of a conventional coating robot. The coating agents used for coating the test panels are conventional water-borne, solvent-borne or powder coating agents. The coating agents are identical to the corresponding coating agents to be used for coating the three-dimensional object, but optionally with the exception of the coating agent to be used to prepare the relevant coating layer on the object. However, if the latter has not yet been established, the composition of the coating agent used for coating the test panels may differ from that of the coating agent yet to be specified for coating the object. However, the solids content of the coating agent should generally not deviate by more than ±10% absolute from the solids content of the coating agent to be used for coating the object. In the case of a pigmented, particularly color- and/or special effect-imparting coating, the color shade of a coating layer applied from the coating agent used for coating the test panels should correspond at least very largely to the required color shade of the coating on the object.

The test panels are coated under defined conditions, i.e. under the influence of a defined set of coating parameters. Coating parameters which may have a perceptible effect on the optical coating result are known to the skilled person. Examples of application parameters are the number of spray passes for the application of a coating layer, flow rate of the coating agent, distance and angle between the application device and the surface to be coated, type of atomiser, air temperature, object temperature, humidity, air downdraft, speed of movement of the application device (track speed), line speed; in the case of pneumatic application, fan air and atomising air; in the case of electrostatically supported application, shaping air, bell speed, and voltage. Examples of drying and curing parameters are type of drying and curing such as curing with high-energy radiation, for example, UV radiation and/or thermal curing; in the case of different successive curing steps, the sequence thereof, heating-up rate, object temperature, oven temperature, evaporation time, stoving time, humidity; in the case of thermal curing, effect of heat with convection and/or infrared radiation.

In a given coating process for a given object, the skilled person may select the set of defined coating parameters for coating the test panels, particularly according to the conditions prevailing during object coating. The set of coating parameters in each case is specified in terms of nature and magnitude on the basis of precise knowledge or on the basis of empirical values and/or precise estimates. The magnitude of individual coating parameters may be constant or altered deliberately in a planned manner during the course of the coating process. A complex set of coating parameters is thus obtained which corresponds to the set of coating parameters prevailing whilst the object is being coated or which is suitable for simulating, at least substantially, the optical coating result which can be obtained with the set of coating parameters prevailing whilst the object is being coated.

It may be expedient if, during the preparation of the test panels provided with inherently identical coatings, not only the layer thickness of the relevant coating layer is varied but also if coating is carried out under the influence of different sets of coating parameters. More particularly, it is advantageous to vary the set of coating parameters prevailing during the preparation of the relevant coating layer. For example, at least two test panels may be coated under the influence of a different set of coating parameters in each case, particularly during the application of the relevant coating layer. With regard to effects of such variations on the optical coating result, sets of coating parameters selected are preferably those that cover various regions, for example, extreme regions and intermediate regions within the coating process given for the object. For example, sets of coating parameters suitable for this purpose are those which lead to the development of different droplet size distributions, droplet impulse distributions or wet film solids of the sprayed coating. In the case of liquid spray coatings, it is particularly suitable for practical purposes to select sets of coating parameters leading to different wet film solids values, for example, to a high, a low and optionally to at least one intermediate wet film solids value of the applied coatings.

Wet film solids are the solids of a liquid spray coating immediately after its application. It may be determined by gravimetry by weighing the difference between a coating layer obtained immediately after application and a coating layer prepared in a similar manner but dried and cured, for example, stoved. The skilled person may determine the sets of coating parameters leading to a corresponding wet film solids value by tests, or estimate on the basis of his experience. The wet film solids value of a coating layer is the result of the influence of a complex set of coating parameters interacting during the application of a liquid spray coating. To that extent it is suitable in practice for representing corresponding sets of coating parameters.

The coatings applied to the test panel(s) are measured in terms of optical surface properties in the conventional manner known to the skilled person as a function of the layer thickness FIG. 2 (16). The term "measurement" includes not only the measurement of optical data with measuring instruments but also purely visual assessments. In order to reduce the number of test panels to be coated and then to be measured, it is preferred to undertake the optical measurements on a single test panel, the relevant coating layer, as mentioned above, being applied with a wedge-shaped layer thickness gradient. It may be advantageous to apply the procedure described in U.S. Pat. No. 5,991,042 taken expressly but not exclusively as a reference, for determining optical measuring data as a function of the coating layer thickness.

Examples of angle-independent optical measurements which may be performed in the process according to the invention are the visual determinations of pitting and sagging limits known to the skilled person, calorimetric measurements on single-color coatings, and measurements of the surface structure. The latter may be performed, for example, with the photometric method known to the skilled person and based on the principle of light reflection modulated by surface structures. All the conventional measuring instruments known to the skilled person may be used, for example, the Wave-scan® sold by BYK-Gardner.

Depending on the optical surface property to be determined, the measurements may be angle-dependent measurements. Angle dependence means dependence on the illumination angle and/or the observation angle. In a first embodiment of angle-dependent measurements, the measurement is performed at a constant illumination angle and varied observation angles. In a second embodiment, the observation angle remains constant during the optical measurement, and the illumination angle is varied. In a third embodiment, both the observation angle and the illumination angle are varied during the measurement. Examples of angle-dependent measurements which may be performed in the process according to the invention are calorimetric measurements, particularly on special-effect coatings and gloss measurements.

The procedure used to take angle-dependent calorimetric measurements of coated test panels is known to those skilled in the art. The calorimetric measurement may be an angle-dependent direct determination of RGB values (red-green-blue values) with a color camera for example serving as the measuring instrument. The measurements are carried out preferably, however, as gonio-spectrophotometric measurements, wherein RGB values may be obtained indirectly.

In gonio-spectrophotometric colorimetry, the reflectance curves of the visible light in the range from, for example, 380 to 800 nm are determined at various observation angles. The determination of the reflectance curves may be carried out for any number of different observation angles. For the purpose of colorimetric measurements on special-effect coatings, a determination at, for example, 5 observation angles of for example 15, 25, 45, 75 and 110° to the specular reflection is generally sufficient. From these points, the reflectance curves for other observation angles can be determined by extrapolation with good accuracy.

When carrying out calorimetric measurements with a fixed illumination angle, the illumination angle is preferably 45° to the perpendicular. When carrying out calorimetric measurements where the illumination angle varies, there may be used any number of different illumination angles. Measurements at, for example, 4 illumination angles of for example 15, 25, 45 and 75° to the perpendicular are generally sufficient because, from these points, the reflectance curves for other illumination angles can be determined by extrapolation with good accuracy.

In colorimetry, light with a known spectral intensity distribution, preferably polychromatic light, is used for illumination. Examples of polychromatic light include, white light, diffuse daylight (standard illuminant D65), neon light (F illuminants) or incandescent lamp light (standard illuminant A). See, e.g., *International Commission on Illumination,* Publication CIE No 15.2, 1986, Central Bureau of the CIE, A-1033 Vienna, P.O. Box 169, Austria or G. Wyszecki, W. S. Stiles, *Color Science*, Wiley, N.Y., 1982, the disclosures of which are incorporated herein by reference. From the reflectance curves obtained by using a given illumination source, it is possible to calculate the color locations resulting for other desired illuminants, for example, the customary calorimetric parameters in the CIELab system L* (lightness), a* (red-green value), b* (yellow-blue value) and hence also C* (chroma) and h*(hue). See DIN 6174. From the reflectance curves (or the calorimetric parameters L*, a*, b*, C* and h*) it is possible to calculate RGB values by transformation, for example, using suitable mathematical algorithms. See Yevgeny Vishnevsky, *Introduction to Color (Java)*, 1997 Master's Project, www.cs.rit.edu/~ncs/color; Wyszecki, et al. *Color Sciences* Wiley, N.Y., 1982; and M. D. Fairchild, *Color Appearance Models,* Addison-Wesley, Reading, 1998, the disclosures of which are incorporated herein by reference. Conventional colorimetry instruments known to the skilled person, for example, the X-Rite® MA 68 sold by X-Rite Company can be used to determine the reflectance curves.

Irrespective of the choice of observation angle and/or illumination angle, the calorimetric measurement may take place with any arrangement of measuring direction, but in the case of test panels coated in a more vertical or in the vertical position and hence under the influence of gravity it may be expedient to measure in at least one defined measuring direction, for example, crosswise, parallel and/or anti-parallel to the axis of the test panel which was aligned in the direction of gravity during coating.

Gloss measurements may be carried out by conventional goniophotometric methods based on the principle of light reflection known to the skilled person. The gloss measurement may take place at one or more different angles, preferably 20° to the perpendicular. All the conventional gloss meters known to the skilled person may be used, for example, the Microgloss® and Micro-Tri-Gloss® sold by BYK-Gardner.

The optical data FIG. 2 (10) are stored in form of a datafile with assignment of the layer thickness of the relevant coating layer and optionally, in addition, the position of the test panels prevailing whilst the coating was prepared FIG. 2 (17). If the test panels were prepared with inherently identical coatings but under the influence of different sets of coating parameters, particularly if the relevant coating layer was prepared under the influence of different sets of coating parameters, the corresponding sets of coating parameters selected during the preparation of the coating in question are also assigned to the optical data. For example, storage may take place with assignment of the respective wet film solids values of the coating applied to the test panels. If desired, the type of test panels concerned (type of material and, optionally, type of precoating) may also be assigned and stored. In the case of colorimetric data, the illuminant used during colorimetry may be assigned and stored. Optical data determined as a function of angle, such as, for example, colorimetric data determined as a function of angle, for example, reflectance curves, or L*, a*, b*, C*, h* values or RGB values and gloss values are stored with additional assignment of the corresponding illumination angles and/or observation angles. The data may be entered manually or, as far as possible, entered directly from the relevant measuring device into the datafile.

In the process according to the invention, coated three-dimensional objects, particularly motor vehicle bodies or motor vehicle body parts are represented. The three-dimensional objects may be actually existing objects or, in particular, objects which exist only as a computer-generated object. The three-dimensional objects exist as three-dimensional objects defined by their computer aided design ("CAD") data. CAD data records of three-dimensional objects may be created with conventional, commercially available software, such as CATIA from Dassault, Pro/Engineer from ICEM/Surf or Alias Wavefront from Silicon Graphics. For the purposes of the process according to the invention, a CAD data record which is suitable for describing the topography (i.e., form design) of the visible surfaces of the three-dimensional object concerned is sufficient. The CAD data record may be newly created accordingly, or generated from a complete CAD data record of the three-dimensional object by reduction. The reduction may be carried out with the same software as that used to create the CAD data records.

The visible surfaces of the three-dimensional object are surfaces visible to the observer, particularly directly visible surfaces. By way of example, in the context of an automobile body, such visible surfaces include the exterior surfaces of the automobile body and surfaces such as door sills. Internal surfaces of the vehicle, such as, for example, the motor space, the passenger space or the trunk are preferably not taken into account, nor are the internal surfaces of hollow spaces.

The visible surfaces defined by the CAD data of the three-dimensional object may be facetted by computer using commercially available virtual-reality software suitable for the realistic representation of surface topographies into a sufficient minimum number of flat polygonal areas (polygons) each being sufficiently small for the sufficiently accurate description of the relevant surface topography FIG.

2 (18). Examples of suitable virtual-reality software include OPUS software from Opticore or AMIRA software from Indeed Visual Concepts.

The polygons are joined together by common edges. The type of polygons is, in principle, arbitrary. Various types of polygons may be combined for the realistic representation of the surface topography; the polygons are preferably exclusively triangular areas joined together by common edges.

The minimum number and the respective areas of the polygons depend on the degree of complexity of the surface topography of the visible surfaces of the three-dimensional object and the desired accuracy of the computer image in the process according to the invention. The sum of all the polygonal areas corresponds, in a close approximation, for example, with a deviation in the region of not more than ±2%, to the surface area of the visible surface(s) of the three-dimensional object. For example, 30,000 to 300,000 polygons are generally sufficient as the minimum number for the accurate description of the surface topography of a motor vehicle body. Of course, the number of polygons selected may be above the minimum number, for example, 50,000 to 3,000,000 polygons in the case of a motor vehicle body. In principle, the number of polygons selected may be any number above the minimum number, the accuracy of the computer image increasing with increasing number, albeit tending to a limiting value. A further increase in the number of polygons does not, in practice, lead to a further increase in accuracy discernible by the observer. It is expedient, therefore, to select a number of polygons above the minimum number which is in reasonable proportion to the computer capacity available.

The polygons have sufficiently small areas. All the areas may be the same size or different. The individual areas lie in a range of values from, for example, 1 square millimeter to 1 square meter. The more complex the surface topography, the smaller should be the area of the polygons selected. In the case of three-dimensional objects with regions of simple (no curvatures or only slight curvatures with up to infinite radius of curvatures per unit of area) and complex surface topography (many curvatures and/or pronounced curvatures per unit of area with a small radius of curvature, corners, beads, edges), it is expedient to facet these into polygons of different areas, i.e. regions of simple surface topography are facetted into polygons with areas within the upper range of values, areas of complex surface topography into polygons with areas within the lower range of values. For example, regions of simple and complex surface topography may be present on the visible surface of a three-dimensional object or on the visible surface of one or more components joined together to form a three-dimensional object, or the three-dimensional object is joined together from components with a simple surface topography and components with a complex surface topography.

Each polygon has a position in space FIG. 2 (11). This position may be defined by means of the area center of gravity of the polygon concerned and its normal in space. Each of these area centers of gravity may be defined clearly, for example, by X,Y,Z coordinates in a Cartesian coordinate system and the position of each of these normals in space by means of their three angles, based on the Cartesian coordinate system. The position of an observer may be defined by X',Y',Z' coordinates or by $X'_{left}, Y'_{left}, Z'_{left}$ and $X'_{right}, Y'_{right}$ and $Z'_{right}$ coordinates for the left and the right eye of an observer, and the position of one or more (n) illumination sources by $X''_1, Y''_1, Z''_1$ to $X''_n, Y''_n, Z''_n$ coordinates in the same Cartesian coordinate system.

Whilst a three-dimensional object is being coated, the conditions are not the same at all locations on the object surface. Rather, sets of coating parameters which are different but constant at fixed locations exist for different locations on the surface. The reasons for this are, for example, the object geometry itself, particularly with three-dimensional objects having a complex shape, deliberately planned differences in the sets of coating parameters at different locations on the surface, and a deliberately planned dynamic change in coating parameters taking place during the coating process.

Variations in the set of coating parameters during the coating process lead to the development of a layer thickness distribution including the required layer thickness on the object surface with a standard deviation of, for example, ±20% to 50%. The layer thickness distribution may be estimated for a given object and a given coating process on the basis of empirical values known to the skilled person, calculated using computer programs for layer thickness simulation of coating layers, for example RobCAD® software from Tecnomatix or, in the case of actual three-dimensional objects, determined in coating tests.

According to what was said in the above paragraph, a defined layer thickness of the relevant coating layer may now be assigned to each individual polygon or groups of polygons joined together by common edges. By virtue of knowing the layer thickness of the relevant coating layer for each individual polygon, the computer is able, in turn, to assign to each individual polygon the optical data of interest which correlate with the layer thickness of the relevant coating layer FIG. 2 (19).

Apart from the layer thickness distribution, a distribution of different sets of coating parameters also generally forms when liquid spray coatings are applied, represented, for example, as a resulting distribution of the wet film solids on the object surface. The distribution of the wet film solids may be estimated by the skilled person or determined, for example, by attaching suitably sized aluminium foil sections of known weight, e.g. 10 cm times 10 cm to 20 cm times 20 cm in size, to appropriate zones of the object surface, carrying out the coating and immediately afterwards folding the coated aluminium foil, weighing it, stoving it and then weighing it again for a differential weighing.

The layer thickness distribution, optionally in combination with the distribution of different sets of coating parameters during coating, may be responsible for perceptible differences in the optical coating result on an object. In order to increase the accuracy of the computer image, it may be advisable, therefore, if the assignment of optical data to the polygons is carried out not only taking account of the layer thickness of the relevant coating layer but also taking account of the set of coating parameters to be assigned to the polygon in each case, particularly the wet film solids value representing said set.

If the optical data are for surface properties which can be perceived differently as a function of the position of an observer, the computer may also, by virtue of knowing the position of each individual polygon, assign to each individual polygon a viewing angle dependent on the position of the observer, and illumination angles dependent on the position of one or more illumination sources, and the optical data, for example, colorimetric data, that correlate with these.

Likewise in order to increase the accuracy of the computer image in the process according to the invention, it may be expedient if the computer, when making this assignment, also takes account of the nature of each polygon (type of material, for example, in the case of three-dimensional objects composed of different materials; type of any precoating) and selects accordingly from the stored optical data differentiated according to type of test panel.

In order to increase the accuracy of the computer image in the process according to the invention, it may also be expedient if the computer, when assigning the optical data, takes account of the position of each individual polygon (when positioning the three-dimensional object, according to the position obtaining during the preparation of the coating on the three-dimensional object in reality) and selects accordingly from the stored optical data differentiated according to the position of the test panels obtaining during the preparation of the coating. When the position of each polygon is taken into account, this is carried out advantageously in such a way that the optical data available for a test panel coated in a horizontal position are assigned to polygons with a more horizontal position, whereas the optical data available for a test panel coated in a vertical position are assigned to polygons with a more vertical position. If optical data are available for test panels coated in a position between the horizontal and vertical, the same applies.

Optical data may thus be assigned by computer to each polygon and a computer image generated by assembling the polygons provided with the assignment FIG. 2 (20). An individual, optical surface property or a combination of at least two optical surface properties may be represented with the computer image.

The computer image may be generated in a visually perceptible manner as a realistic representation or as a scaled coded representation, for example, as a false color representation or as a representation with various grey levels or different patterns. The computer image may also, however, be generated as a computer image existing only as a set of data. Which type of computer image is more advantageous in the individual case depends on the type of optical data considered and on the optical surface property (properties) to be represented, or on the technical problem which is being monitored with the evaluation of the computer image.

If the optical surface property measured in the process according to the invention is, for example, the impression of color and/or special effect, this may be represented visually in a realistic manner as an impression produced on the three-dimensional object by assigning to each polygon a fundamental color defined by RGB values obtained from corresponding calorimetric measurements, each polygon being represented by pixels in each case composed of a triple combination of red-green-blue. Gloss reflections may be reproduced by varying brightness or contrast of the pixels of the polygons concerned. By assembling the polygons, the object may be represented three-dimensionally in the corresponding visually perceptible impression of color.

The generation of the computer image is not confined to the reproduction with an illumination with the illuminant used during the optical measurement, for example, during colorimetry. As explained above in connection with colorimetry, the colorimetric data are available independently of the illuminant used during colorimetry, or may be calculated if the illuminant used for illumination during colorimetry is known. The generation of the computer image may be carried out with simulated illumination with one illumination source or with several illumination sources of any spectral intensity distribution in the range of visible light by calculating the RGB values from the reflectance curve determined and stored during colorimetry with illumination with a known illuminant. In the event of several illumination sources, these preferably have an identical spectral intensity distribution in each case.

The object as a whole or a section of the object may be represented, for example, by means of a conventional zoom function. For the purposes of the process according to the invention, the use of a conventional personal computer (for example, Pentium III, 600 MHz with 3D graphics card) is sufficient in practice. Of course, computers with a higher computing capacity may be used to advantage.

The computer image may be carried out according to the visual impression produced in diffuse or directed illumination with one or more illumination sources.

The visually perceptible, realistic computer image or computer image existing in the form of a scaled, coded representation may be generated with all the conventional virtual-reality techniques. The term three-dimensional representation should be taken to mean not only the form of a true three-dimensional representation but also a two-dimensional, perspective representation.

The two-dimensional perspective image may be carried out in a conventional manner, for example, on a monitor or by means of a projector onto a screen.

The true three-dimensional image may be carried out with the conventional methods for producing stereo images. The offset images required for this, due to the distance between the eyes of an observer, may be calculated by the software by simulation or taking account of positions defined for the left and right eye. The observer may wear, for example, special spectacles as an aid, and observe the three-dimensional computer image on a monitor, on a projection or back-projection screen whereby, depending on the physical principle used, two separate images which together make up a spatial image are shown either simultaneously (observation with pole filter spectacles) or with a high image changing frequency (observation with shutter spectacles). Another alternative is the corresponding image for the observer by way of a head-mounted display (helmet or spectacles) with two separate displays for the left and right eye, or the complete three-dimensional computer image in a virtual-reality cave.

Irrespective of the medium chosen for the three-dimensional computer image, the computer image may be carried out as a static image, film, or as an interactive real-time computer image. In the computer image as a film and particularly in the real-time computer image, it is possible to alter the position of the object to be viewed and/or the position of the observer. Depending on the change in position, the computer carries out a constant reassignment of the optical data, for example of RGB values to each pixel of each polygon. In the real-time computer image in particular, the computer learns the respective relative positions of object and observer and optionally illumination source(s) with the conventional means for the virtual-reality technique used in each case. For example, the observer may simulate a change in relative position by means of a computer mouse, a joystick or a data glove and thus control the computer. The observer may also actually move, however, and inform the computer of the change in relative position by means of a device connected to the observer, for example, by means of a transmitter or a camera which tracks a marking fixed to the observer.

In a representation of the computer image as a scaled, coded representation, polygons to which optical data lying outside a required range are assigned are represented with one or more other codes as polygons with an assignment of optical data lying within the required range. In this way, different regions of the object surface in terms of position and area may be identified immediately as lying inside or outside the required range of optical surface properties concerned. Required regions, tolerance regions and regions lying outside these can be defined for all the optical surface properties.

It is clear to the skilled person that computer images generated with the process according to the invention may be printed in the form of visually perceptible representations on paper or other materials too.

Whereas a computer image existing as a coded representation may be evaluated visually, a computer image existing only as a data set may be evaluated by computer.

It is possible, with the process according to the invention, to simulate the optical coating result for a three-dimensional object to be coated on the basis of optical surface properties measured on coated test panels.

The computer images may be evaluated, for example, in terms of a desired, e.g. smallest possible deviation of optical data of the polygons. Deviations within optical surface properties caused by the layer thickness distribution of the relevant coating layer on the object surface may be simulated in terms of location and area.

In a given coating process for a given three-dimensional object, the process according to the invention may assist in the selection of the coating agent suitable for and to be used for the preparation of the relevant coating layer on the object. Coating tests to be carried out in practice on the object, for example, line trials in body painting plants, may be avoided or their number at least substantially reduced and carried out virtually instead, as a computer simulation.

The coatings developer obtains with the process according to the invention a valuable tool in the development of coating agents for the preparation of the relevant coating layer. More particularly, the process according to the invention is suitable for the development of a coating agent which, as far as possible, is not susceptible to layer thickness variations or variations in the set of coating parameters. For example, the process according to the invention may be carried out with several coating agents of different compositions according to the nature and amount of components. Methods of statistical trial planning may be used advantageously for the variation within the composition of the coating agent. It is clear to the skilled person that there are limits to the variation within the composition of the coating agent to be used for preparing the relevant coating layer. For example, the solids content of the coating agent should not deviate by more than ±10% absolute from that of the coating agent to be used for coating the object. In the development, particularly color shade development, of a pigmented coating agent, particularly a color-imparting and/or special effect-imparting coating agent, the color shade of a coating layer applied from it should correspond at least very largely to the required color shade of the coating on the object.

If computer images generated with the process according to the invention and existing only as a data set are used, the computer evaluation thereof may be used to develop a coating formula proposal for the coating agent to be used for preparing the relevant coating layer or for optimising the formula thereof. For example, by virtue of knowing the specific influence of various components of the coating agent on the optical coating result, an optimisation program may interpolate between various computer images assigned to a known coating composition towards an optimum, and work out an associated coating formula proposal.

What is claimed is:

1. A process for the generation of a computer image of a coated, three-dimensional object comprising the steps of, in appropriate order:

a) preparing a coating comprising a relevant coating layer with variable layer thickness on at least one test panel, b) taking a plurality of measurements of at least one optical surface property as a function of the layer thickness of the relevant coating layer, c) storing the optical data in a datafile with assignment of the layer thickness of the relevant coating layer, d) facetting the visible surfaces of a three-dimensional object by computer into a sufficient number of flat polygonal areas each being sufficiently small for the sufficiently accurate description of the surface topography, e) assigning layer thickness of the relevant coating layer and associated optical data in each case to each individual polygonal area by computer, and f) assembling the polygonal areas into a computer image of the three-dimensional object.

2. The process of claim 1, wherein the relevant coating layer is applied with a wedge-shaped layer thickness gradient.

3. The process of claim 1, wherein the coating is selected from the group consisting of i) a single-layer top coating consisting of the relevant coating layer and ii) a multi-layer coating with the relevant coating layer as one of the coating layers forming the multi-layer coating.

4. The process of one of claim 1, wherein the at least one test panel in step a) assumes a position selected from the group consisting of a horizontal orientation and a vertical orientation.

5. The process of one claim 1, wherein at least one test panel is coated in a horizontal orientation, at least one further test panel is coated in a vertical orientation, and wherein the relevant optical data are stored with assignment of the relevant orientation prevailing whilst the test panels are being coated, and are selected accordingly when assigned to each individual polygonal area.

6. The process of claim 5, wherein at least one additional test panel is coated in an orientation arranged between the horizontal and the vertical orientation and the relevant optical data are stored with assignment of the relevant orientation prevailing whilst the additional test panel is being coated, and are selected accordingly when assigned to each individual polygonal area.

7. The process of claim 1, wherein the test panel is coated under the influence of a defined set of coating parameters.

8. The process of claim 1, wherein at least two test panels are coated under the influence of a different set of coating parameters for each panel and the relevant optical data are stored with assignment of the relevant set of coating parameters and selected accordingly when assigned to each individual polygonal area.

9. The process of claim 8, wherein the relevant coating layer is prepared under the influence of said diefferent set of coating parameters for each panel.

10. The process of claim 9, wherein the various sets of coating parameters are those which lead to various wet film solids values of the relevant coating layer.

11. The process of claim 1, wherein the measurements of optical surface properties are selected from the group consisting of non angle-dependent and angle-dependent measurements, non angle-dependent measurements being selected from the group comprising visual determinations of pitting limits, visual determinations of sagging limits, colorimetric measurements on single-color coatings and measurements of the surface structure, angle-dependent measurements being selected from the group consisting of colorimetric measurements and gloss measurements.

12. The process of claim 11, wherein optical data measured as a function of angle are stored with assignment of the relevant angles selected from the group consisting of observation angles, illumination angles and combinations thereof, and are assigned to each individual polygonal area as a function of the position of an observer and at least one illumination source.

13. The process of claim 1, wherein the computer image is a representation selected from the group consisting of i) representation of an individual optical surface property and ii) representation of a combination of at least two optical surface properties.

14. The process of claim 1, wherein the computer image is a visually perceptible representation selected from the group consisting of
   i) a realistic, three-dimensional representation,
   ii) a scaled, coded three-dimensional representation,
   iii) a realistic, two-dimensional perspective representation, and
   iv) a scaled, coded, two-dimensional, perspective representation.

15. The process of claim 1, wherein the computer image exists only as a data set.

16. The process of claim 1, wherein the computer image is selected from the group consisting of static image, film and interactive real-time representation.

17. The process of claim 1, wherein the three-dimensional object is selected from the group consisting of motor vehicle bodies and body parts.

* * * * *

UNITED STATES PATENT AND TRADEMARK OFFICE
CERTIFICATE OF CORRECTION

PATENT NO. : 6,731,277 B2
DATED : May 4, 2004
INVENTOR(S) : Paul Rupieper and Christian Voye It is certified that error appears in the above-identified patent and that said Letters Patent is hereby corrected as shown below:

Column 12,
Line 33, "one of" should be deleted.
Line 37, "one" should be deleted.
Line 61, "diefferent" should be replaced with -- different --.

Signed and Sealed this

Third Day of August, 2004

JON W. DUDAS
*Acting Director of the United States Patent and Trademark Office*